E. BELLING.
Making Confectionery.
No. 25,236.  Patented Aug. 30, 1859.
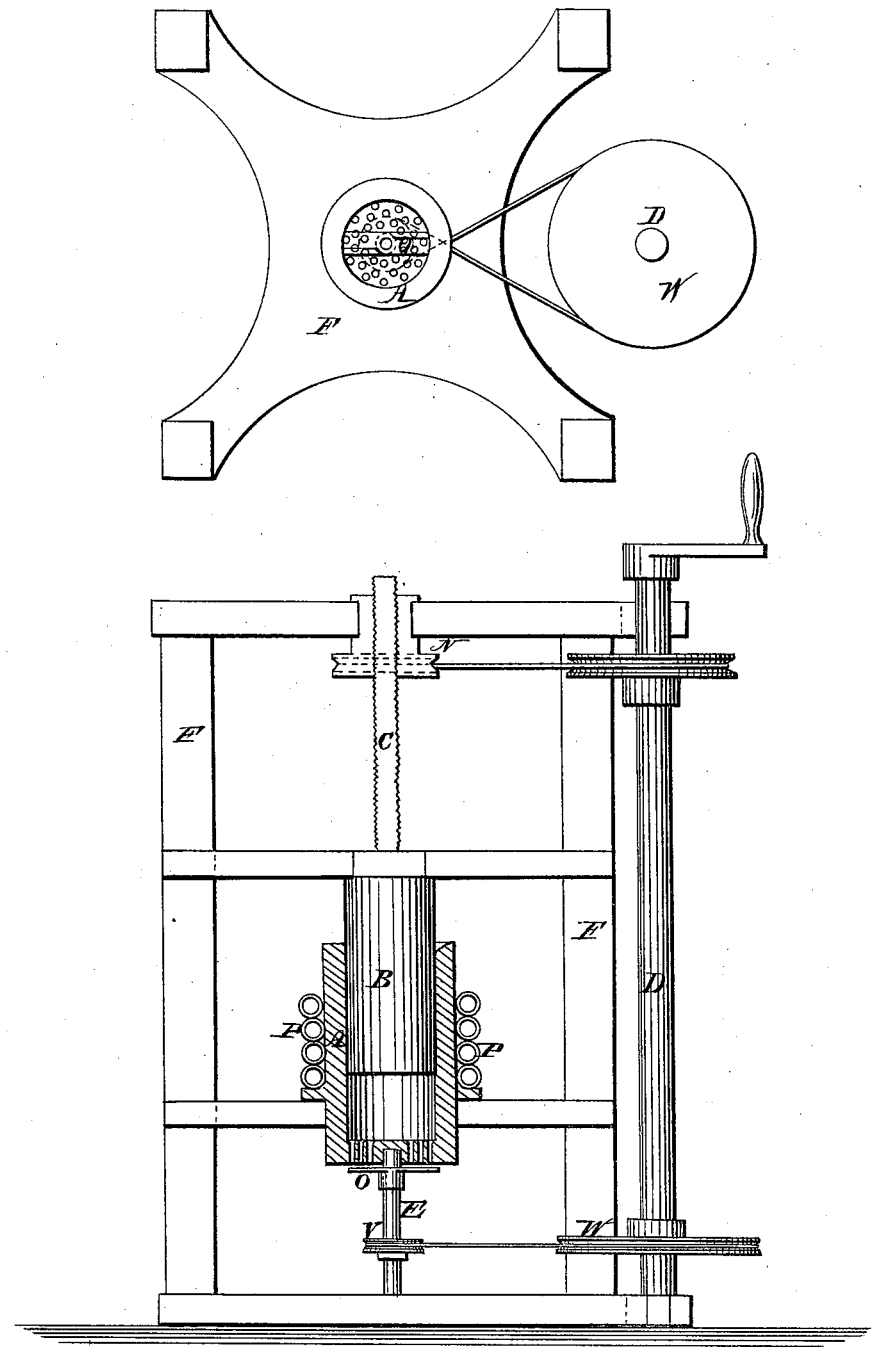
Witnesses:
Inventor:

UNITED STATES PATENT OFFICE.

EDMUND BELLING, OF NEW YORK, N. Y.

IMPROVEMENT IN LOZENGE-MACHINES.

Specification forming part of Letters Patent No. 25,236, dated August 30, 1859.

*To all whom it may concern:*

Be it known that I, EDMUND BELLING, of New York, in the county and State of New York, have invented a new and Improved Lozenge-Machine; and I do hereby declare that the following is a full and exact description thereof, reference being had to the accompanying drawings, and to the letters of reference marked thereon.

The nature of my invention consists in the combination of a revolving or reciprocating knife with a power-press in such a manner that after the lozenge-dough is pressed through the perforated bottom in said press in a continued string the lozenges will be cut off by the action of said knife the required thickness.

A is the cylinder of the press, supported on the frame-work F.

B is the piston or ram, fitting tight in the cylinder and acted upon by a screw, C, operated from the shaft D by means of the pulleys N and M. On the outside of the cylinder steam-pipes P are placed to keep the dough warm. The bottom of the cylinder is perforated with holes corresponding in size and shape with the lozenge required to be made. This bottom may be made loose, to be changed with another one arranged with different-shaped holes.

O is a knife attached to the spindle E, and situated in the center of the bottom. This knife is placed as near to the bottom as possible, and is revolved by said spindle by means of the pulley V, operated from the pulley W, fast to the shaft D. Instead of placing the spindle in the center of the bottom, the same may be placed on one side, in which case the knife must be made so much larger, so as to sweep in its revolution all over the surface of the bottom; or the knife may be placed on a spindle on one side made with a cutting-edge on each side, and have a reciprocating motion communicated to it.

When the cylinder is filled with dough, the shaft D is set in motion, moving thereby the piston or ram B downward, and consequently forcing the dough through the perforations in the bottom of the cylinder in continued strings and of the shapes corresponding to the holes made in the bottom. The knife O is at the same time put in motion through the pulleys W and V, cutting in its revolution from each string of dough as the same is forced through the holes one piece or lozenge off. The thickness of each piece or lozenge depends on the relative speed of the knife in proportion to the motion of the ram, and may be regulated by means of the pulleys to any desired length or thickness.

What I claim as my invention, and desire to secure by Letters Patent, is—

The combination of a revolving or reciprocating knife with the lower part of a press and operated simultaneously with the same, in the manner and for the purpose substantially as described.

EDMUND BELLING.

Witnesses:
 HENRY E. ROEDER,
 JAMES W. ELGAR.